UNITED STATES PATENT OFFICE

HEINRICH RITTER AND WALTER BRUNNER, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

NEW INDIGOID DYESTUFFS OF THE ANTHRAQUINONE SERIES

No Drawing. Application filed April 14, 1931, Serial No. 530,134, and in Germany April 23, 1930.

Our present invention relates to new indigoid dyestuffs of the anthraquinone series which are derived from anthraquinone-1.2-oxythiophene and correspond to the general formula:

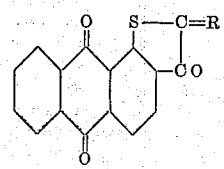

(wherein R is one of the customary components of indigoid or thioindigoid dyestuffs).

The anthraquinone-1.2-oxythiophene used as starting material for the preparation of these dyestuffs is described in U. S. application Ser. No. 491,073, filed October 24, 1930.

The new dyestuffs dye vegetable fibers brown, grey to olive-green shades of a good fastness and levelling power. When compared with the hitherto known indigoid dyestuffs they can be very easily vatted, in some cases already at room temperature.

Of a special importance are those of these dyestuffs which correspond to the general formula:

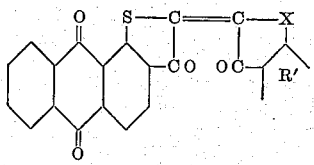

(wherein R' means a radical of the benzene, naphthalene or anthraquinone series and X means S or NH).

The dyestuffs may be prepared by the following methods:

The symmetrical thioindigo is obtained by treating anthraquinone - 1.2 - oxythiophene with an oxidizing agent. Asymmetrical dyestuffs are produced by condensing this anthraquinone-1.2-oxythiophene with one of the customary components of indigoid dyestuffs, for instance ortho-diketones, such as acenaphthenequinone, isatines or their chlorides, oxythionaphthenes or their anils or by condensing an anil of anthraquinone-1.2-oxythiophene with compounds containing a reactive methylene group.

In order to further illustrate our invention the following examples are given, the parts being by weight and all temperatures in centigrade derees; but we wish it to be understood that our invention is not limited to the examples given nor to the reacting conditions mentioned therein.

Example 1

10 parts of anthraquinone-1.2-oxythiophene are dissolved in about 500 parts of a 2% caustic soda lye and to this solution a solution of 15 parts of potassium ferricyanide in about 150 parts of water is slowly added while stirring. Thereby the symmetrical thioindigo of the formula:

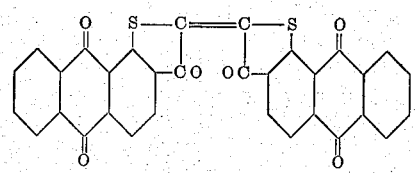

separates as a reddish brown precipitate. It is filtered, washed and dried. It dyes cotton from an orange-brown vat brownish shades and dissovles in concentrated sulfuric acid to a pure green solution.

Instead of potassium ferricyanide, hydrogen peroxide, persulfate or other similarly acting oxidizing agents may be used.

Example 2

30 parts of 5.7-dibromo-isatine are converted into the chloride by treating it at 100–105° with 22 parts of phosphorus pentachloride in 500 parts of mono-chlorobenzene. This solution is condensed at 80–90° with a mixture of 28 parts of anthraquinone-1.2-oxythiophene and 2000 parts of mono-chlorobenzene. The new dyestuff immediately precipitates as dark blue crystals which are filtered and dried. It corresponds to the following formula:

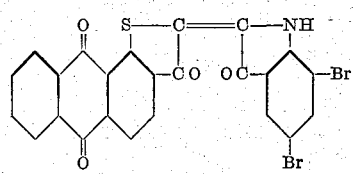

It dissolves in concentrated sulfuric acid with a green tint and dyes cotton from an orange vat grey shades.

*Example 3*

21 parts of 9-chloro-α-naphthisatine are converted into the chloride by treating it at 100–105° with 22 parts of phosphorus pentachloride in 500 parts of mono-chlorobenzene. This solution is condensed at 90–100° with a mixture of 28 parts of anthraquinone-1.2-oxythiophene and 2000 parts of mono-chlorobenzene. The new dyestuff immediately precipitates in the form of dark violet crystals which are filtered and dried. It corresponds to the following formula:

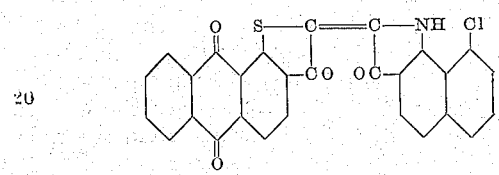

It dissolves in concentrated sulfuric acid with an olive green tint and dyes cotton from an orange brown vat full olive-green shades of a good fastness.

By starting from bromo-9-chloro-naphthisatine instead of 9-chloro-α-naphthisatine a bromine-containing dyestuff is obtained dyeing cotton from an orange-brown vat intense bluish grey shades of a rather good fastness.

By replacing 9-chloro-α-naphthisatine by the corresponding amount of dibromo-β-naphthisatine a dyestuff is produced which represents a blackish green powder soluble in concentrated sulfuric acid with a bluish green tint and dyeing cotton from a yellowish red vat greyish green shades.

*Example 4*

103 parts of anthraquinone-1.2-oxythiophene-2'-(paradimethylamino)-anil and 50 parts of 6-ethoxy-oxythionaphthene are heated in 2000 parts of glacial acetic acid to 100–105° for 5 hours. By filtering and drying a brown powder is obtained which dyes cotton from a yellowish red vat yellowish brown shades and corresponds to the formula:

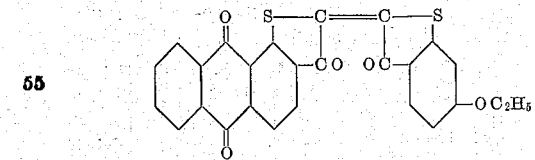

By replacing 6-ethoxy-oxythionaphthene by 6-chloro-oxythionaphthene a reddish brown dyeing product is obtained.

*Example 5*

80 parts of 2.1-naphthoxythiophene-2'-(para-dimethyl-amino)-anil and 70 parts of anthraquinone-1.2-oxythiophene are heated in about 2000 parts of glacial acetic acid to 100–105° for 6–7 hours. By filtering and drying a dark brown powder is obtained which dissolves in concentrated sulfuric acid with a bluish green tint and dyes cotton from a yellowish red at brown shades. It corresponds to the following formula:

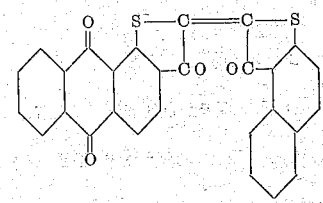

By replacing the anil of 2.1-naphthoxythiophene by that of 2.3-naphthoxythiophene a black powder is obtained which dissolves in concentrated sulfuric acid with an olive-green tint and dyes cotton from a red vat greenish grey shades.

*Example 6*

60 parts of 9-chloro-α-naphthisatine and 70 parts of anthraquinone-1.2-oxythiophene are well stirred in 2000 parts of glacial acetic acid, then mixed with 5 parts of concentrated hydrochloric acid and boiled for about 5 hours. By filtering and drying a dark powder is obtained soluble in concentrated sulfuric acid with a brown tint and dyeing cotton from a yellowish brown vat yellowish olive shades. This product contains probably the dyestuff of the following formula:

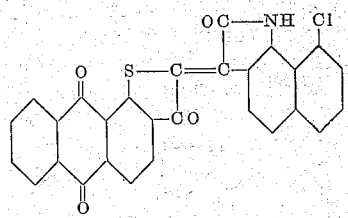

We claim:

1. As new compounds the indigoid dyestuffs of the anthraquinone series corresponding to the general formula:

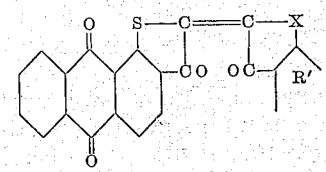

(wherein R' means a radical of the benzene, naphthalene or anthraquinone series and X means S or NH), which dyestuffs dye the vegetable fiber brown, grey to olive grey shades of a good fastness and levelling power.

2. As new compounds the indigoid dyestuffs of the anthranquinone series corresponding to the general formula:

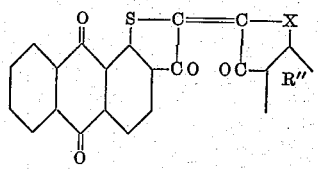

(wherein R″ means a naphthalene nucleus which may be halogenated and X means S or NH), which dyestuffs dye the vegetable fiber brown, grey to olive grey shades of a good fastness and levelling power.

3. As a new compound the indigoid dyestuff of the probable formula:

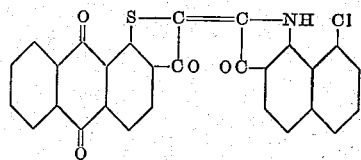

which dyestuff forms dark violet crystals dissolving in concentrated sulfuric acid with an olive green tint, dyeing cotton from an orange brown vat full olive-green shades of a good fastness.

4. As a new compound the indigoid dyestuff of the probable formula:

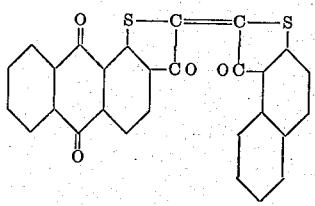

which dyestuff forms a dark brown powder dissolving in concentrated sulfuric acid with a bluish green tint, dyeing cotton from a yellowish red vat brown shades of a good fastness.

In testimony whereof, we affix our signatures.

HEINRICH RITTER.
WALTER BRUNNER.